United States Patent [19]

Price, Jr. et al.

[11] Patent Number: 5,226,549

[45] Date of Patent: Jul. 13, 1993

[54] CARTRIDGE PROTECTOR FOR SLIDING RACK STORAGE SYSTEMS AND METHOD THEREFORE

[75] Inventors: Macy J. Price, Jr., Louisville; Timothy J. Pickles, Brighton, both of Colo.

[73] Assignee: Engineered Data Products, Inc., Broomfield, Colo.

[21] Appl. No.: 831,418

[22] Filed: Feb. 5, 1992

[51] Int. Cl.$^5$ .............................................. A47F 5/00
[52] U.S. Cl. ...................... 211/162; 211/41; 211/175; 312/198
[58] Field of Search ............... 211/162, 94, 175, 41; 312/198

[56] References Cited

U.S. PATENT DOCUMENTS

| | | | |
|---|---|---|---|
| 2,098,828 | 11/1937 | Ludwick | 211/162 X |
| 4,898,284 | 2/1990 | Arens | 211/162 |
| 4,982,852 | 1/1991 | Johansen | 211/162 |
| 5,062,535 | 11/1991 | Potter | 211/162 |
| 5,072,838 | 12/1991 | Price | 211/162 |
| 5,109,994 | 5/1992 | Kidd et al. | 211/162 |

Primary Examiner—Robert W. Gibson, Jr.
Attorney, Agent, or Firm—Glenn L. Webb

[57] ABSTRACT

A safety device for storage rack systems to sweep tape cartridges out of the path of movement of a sliding rack and to at least partially absorb the impact of the striking the tape cartridges. Protective members are mounted on the sides of each of the sliding racks extending in a direction away from the center racks and in the path of movement of the sliding racks to move data tape cartridges out of the path of the sliding rack to reduce the damage to the data tape cartridges or storage rack system.

17 Claims, 5 Drawing Sheets

CARTRIDGE PROTECTOR FOR SLIDING RACK STORAGE SYSTEMS AND METHOD THEREFORE

BACKGROUND OF THE INVENTION

1. Field of the invention

This invention relates to the field of storage rack systems for magnetic data tape cartridges and particularly to an apparatus and method for protecting tape cartridges in sliding rack storage systems.

2. Statement of the Problem

Large information systems utilizing computers are requiring more and more data cartridge storage cartridges. This correspondingly requires more storage area for these cartridges. Since there is typically only a limited amount of physical space allotted to the storage of the data cartridges, there is increasing pressure to better utilize the space available for the storage of data storage cartridges.

One such solution to the problem of providing increased storage capacity within limited areas is the use of sliding rack systems, such as the double density sliding rack systems manufactured by Engineered Data Products, Inc. of Louisville, Colo. In this system, sliding racks are mounted in the front of and the rear of static racks. This system provides additional storage with only a small amount of increased size.

One problem in sliding rack storage systems occurs when tape cartridges are not fully inserted into the static storage racks. The sliding racks may strike against cartridges which are not fully inserted into the static racks, resulting in damage to the cartridge or even the rack itself.

Thus, a problem exists in sliding storage rack systems wherein damage may occur from cartridges which are not fully inserted in the appropriate storage pack.

3. Solution to the Problem

This problem and others are solved by the storage system of the present invention. The present invention provides a storage rack system for securing a plurality of tape cartridge holders in a high density capacity while reducing the possibility of damage from cartridges which are not fully inserted.

The present invention provides a safety device which will deflect cartridges which extend partially into the path of the sliding racks back into the storage racks.

The present invention provides a safety device which will at least partially absorb the impact from striking cartridges which extend partially into the path of the sliding racks.

The present invention provides a safety device which is easily mountable as original equipment or retrofitted to existing devices.

These and other solutions are provided by the present invention as set forth in the accompanying description and drawings.

SUMMARY OF THE INVENTION

The present invention provides a safety device for movable storage rack systems. These types of storage rack systems typically include a center rack having tape cartridge storage capacity on opposing sides of the center rack. Sliding racks having additional tape cartridge storage capacity are mounted on either or both of the front and rear sides of the center rack for movement along the sides of the center rack.

The sliding racks are mounted on either or both sides of the center racks so that at least one column of tape cartridges stored on the center racks are accessible. The sliding racks can then be moved along the center racks so any desired column of the center racks can be accessed for cartridge entry and removal.

The safety device of the present invention includes a deflector member extending angularly or curved outward from the rear edges of the sliding racks on both of the leading sides of each sliding rack. The deflector member is preferably formed of a plastic material and secured by rivets on the rear of the sliding racks. The deflector members angle or curve into the path of movement of the sliding racks and away from the center rack. As the sliding racks are moved along the rack system, the deflector members "sweep" any cartridges which are not fully inserted in the center storage racks back into the storage area of the center rack to prevent damage to the cartridges or the rack system.

This "sweeping" action occurs due to the design of the deflector members. The outer edge of the deflector members initially engage any cartridges extending in the path of movement of the sliding racks. As the sliding rack continues forward, the pressure from the deflector member against the cartridges will increase due to the curved or angled portion of the deflector member as the sliding rack continues to move to deflect the cartridges inward out of the path of the sliding rack.

The deflector members also act as "bumpers" to at least partially absorb the impact of striking cartridges which it is not able to deflect. The compression of the angled or curved portion of the deflector member and the resilience of the plastic material will assist in absorbing impact.

The deflector member is relatively inexpensive and can be supplied as original equipment on the rack systems or retrofitted to existing systems.

These and other features of the present invention will be evident from the detailed description of a preferred embodiment taken in conjunction with the drawings.

DETAILED DESCRIPTION OF A PREFERRED EMBODIMENT

1. Tape cartridge storage systems

The present invention provides a safety device for protecting tape cartridges and rack systems from damage due to tape cartridges extending into the path of movement of sliding racks. One possible preferred embodiment of the present invention is illustrated in FIGS. 1-5. It is to be expressly understood that this descriptive embodiment is for explanatory purposes only and is not meant to limit the scope of the claimed invention. Other embodiments and modifications are considered to be within the range of the inventive concept.

Figure 1:
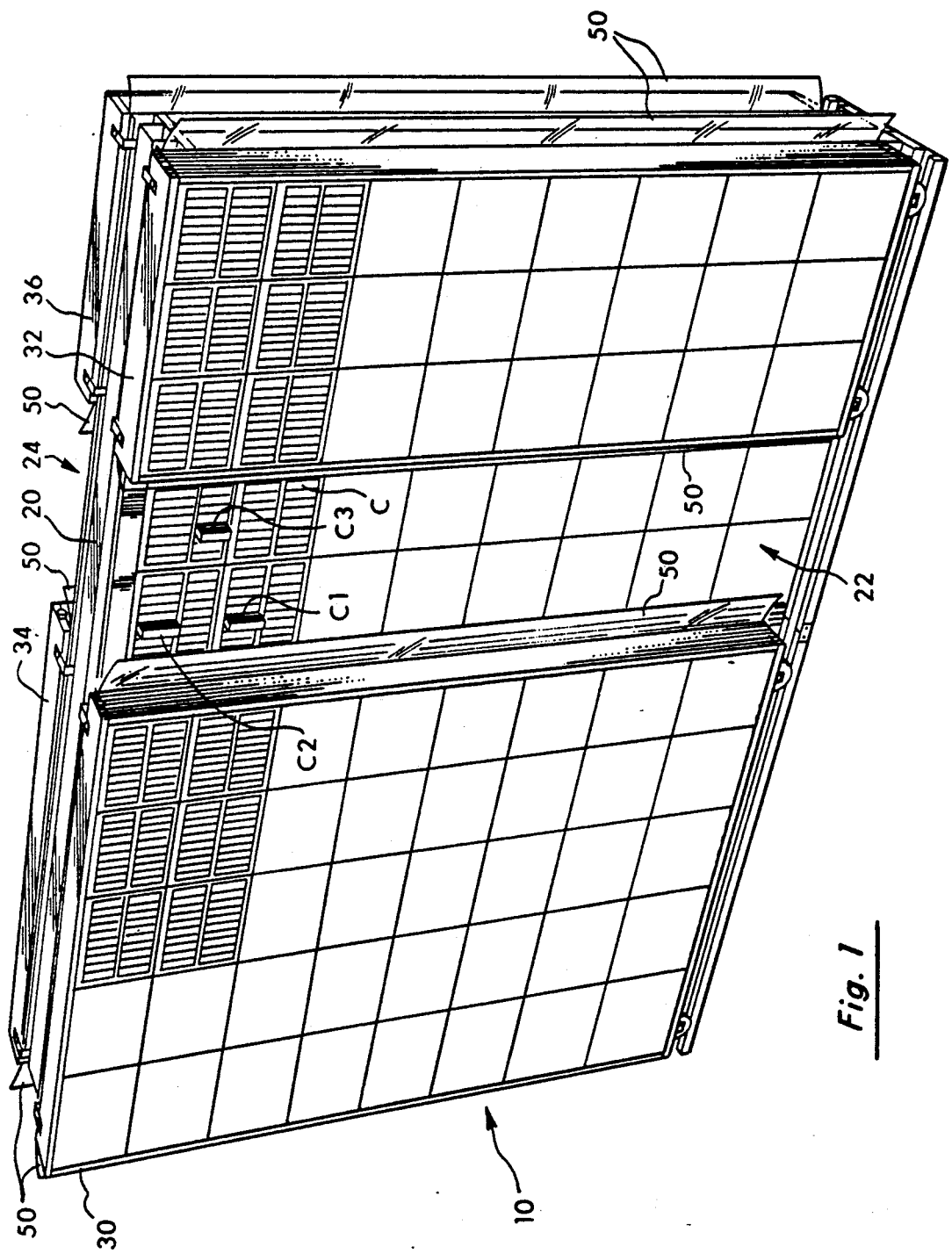
FIG. 1 is a perspective view of a sliding rack tape storage system with a preferred embodiment of the cartridge deflector members of the present invention.
Figure 2:
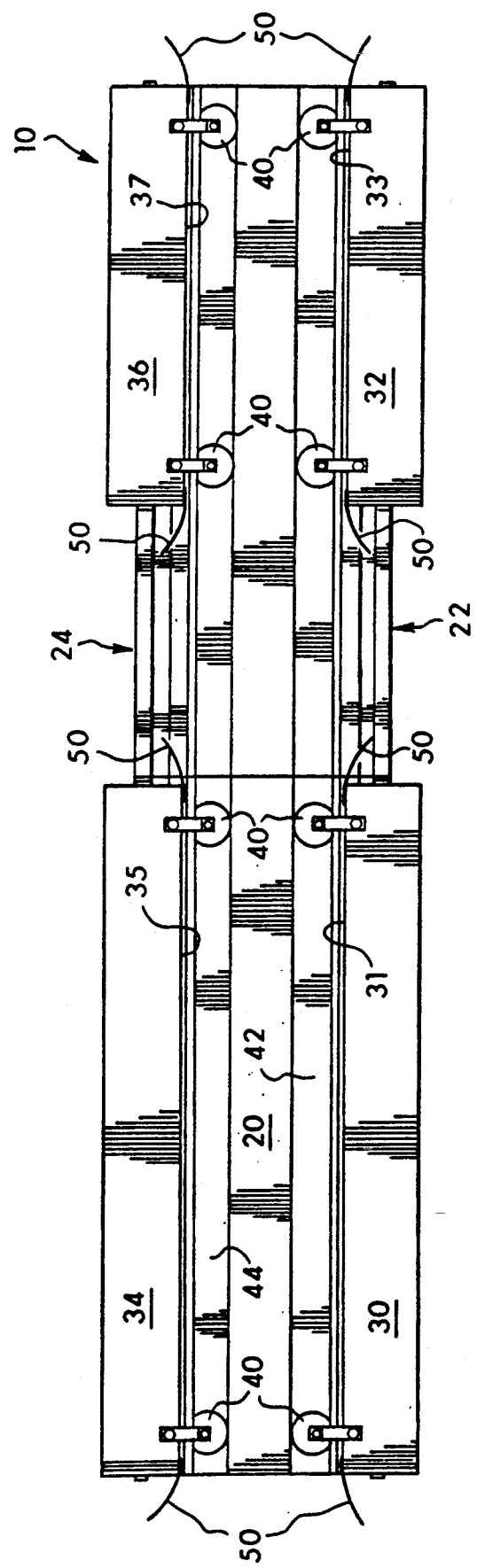
FIG. 2 is a top view of the rack storage system of FIG. 1.

Storage rack system 10, shown in FIG. 1, includes center storage rack 20. Center storage rack 20 has storage areas 22, 24 on opposing sides of center storage rack 20. Tape cartridges C are stored within each storage area 22, 24 by well known devices, such as tape cartridge holder packs.

Figure 3:
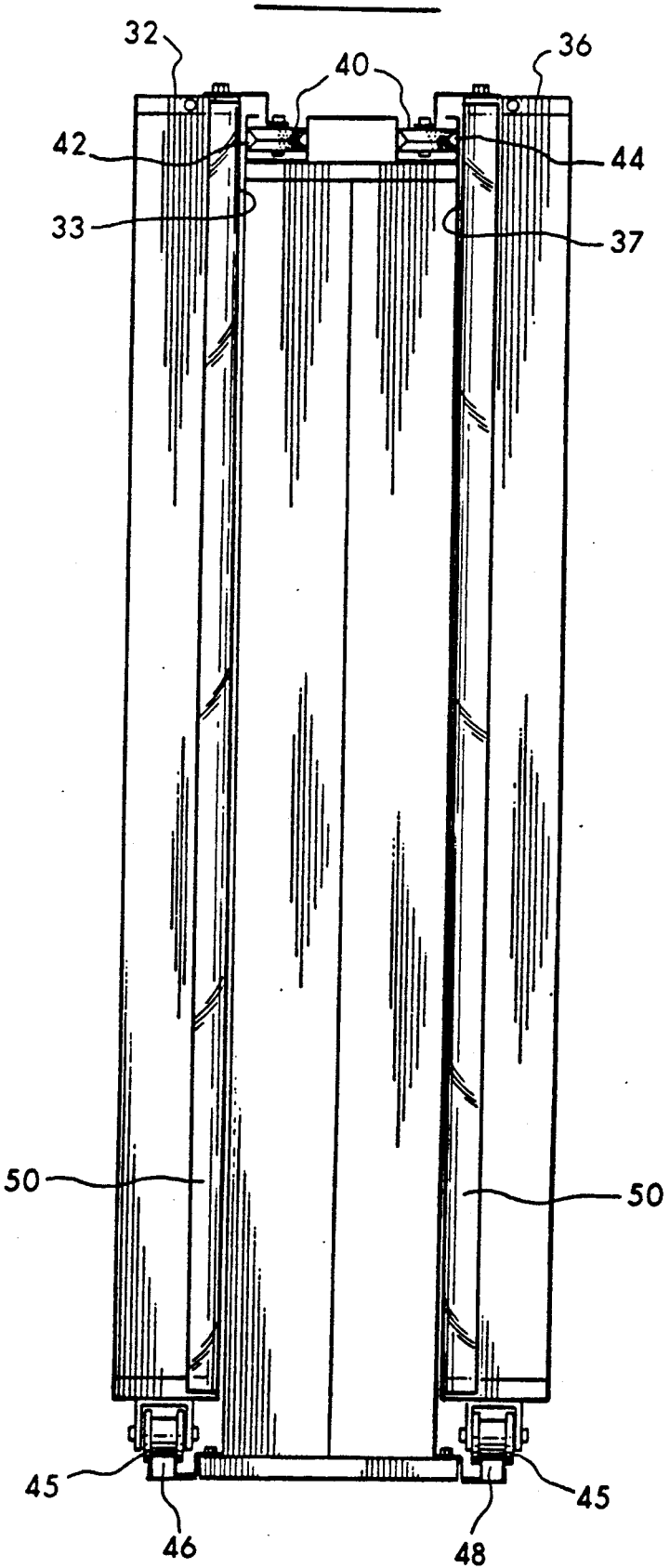
FIG. 3 is a side view of the rack storage system of FIG. 1.
Figure 4:
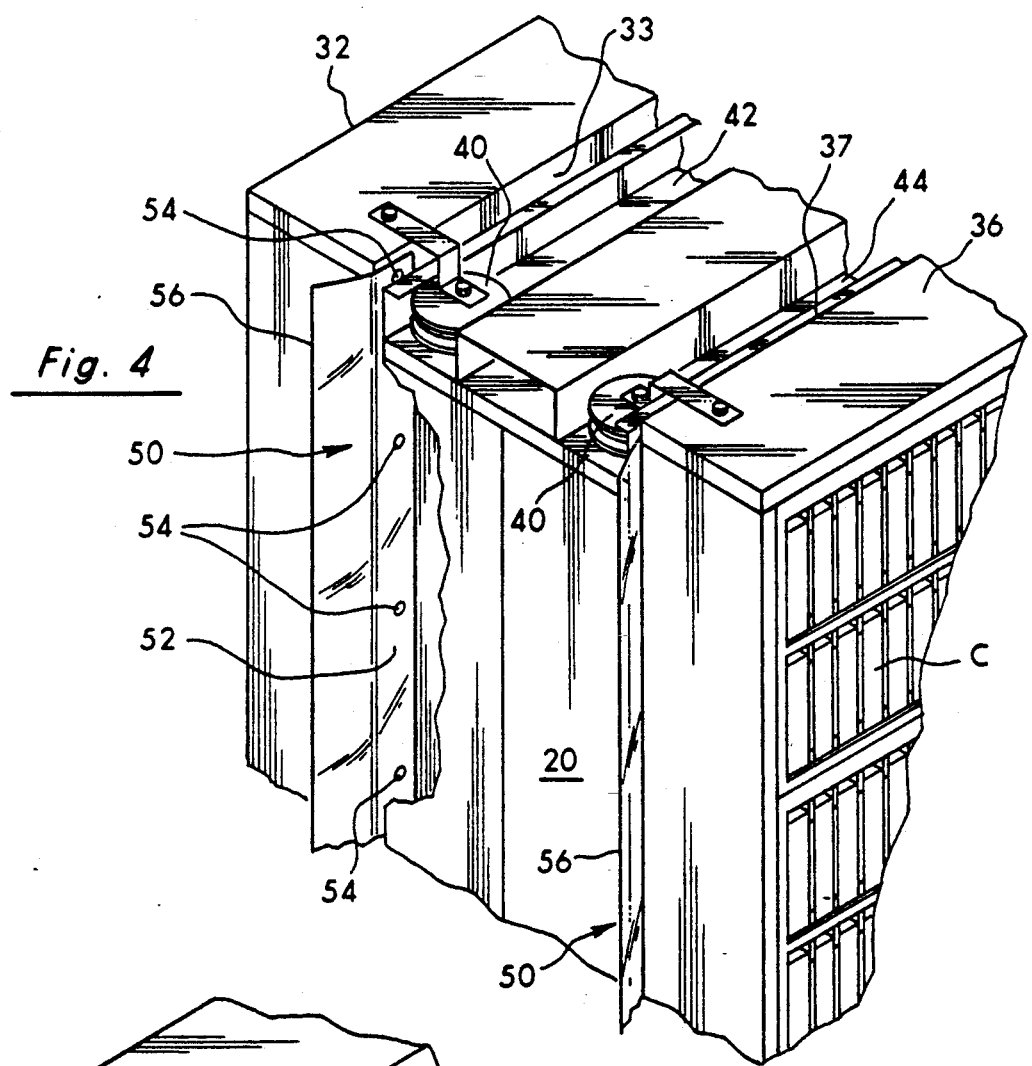
FIG. 4 is an upper corner perspective view of the system of FIG. 1.

Sliding racks 30, 32, 34, 36 are conventionally mounted onto center storage rack 20 to slide, as described below, relative to center storage rack 20. In the descriptive embodiment, sliding racks 30–36, shown in FIGS. 2, 3, include upper rollers 40 engaged in roller guides 42, 44 on the upper portion of center storage rack 20. Lower rollers 45, shown in FIG. 3, are mounted on the lower portion of sliding racks 30–36. Lower rollers 45 engage lower roller guides 46, 48 to support sliding racks 30–36 for movement relative to center storage rack 20. This description of a particular sliding rack system is not meant to limit the present invention to this particular rack system. The present invention is designed to operate with conventional sliding rack systems.

Each sliding rack 30–36 include storage areas for storing tape cartridges C therein, similar to storage areas 22, 24. Sliding racks 30–36 are moved in order to access or store tape cartridges C in storage areas 22, 24 of center storage rack 20, as illustrated in FIG. 1. In this manner, high density storage of tape cartridges is possible. However, as discussed in the background of the invention, tape cartridges, such as tape cartridges $C_1$, $C_2$, $C_3$, shown in FIG. 1, which are not fully inserted in the center rack storage areas 22, 24, may be struck by sliding racks 30–36 as the sliding racks are moved to gain access to storage areas 22, 24. This can, at the very least, damage the tape cartridges and to data stored thereon, and may even result in damage to rack system 10 itself. The present invention provides tape cartridge deflector members 50 to minimize the damage due to tape cartridges which are not fully inserted into the center storage rack storage areas from impact due to movement of the sliding racks. The present invention is independent of the tape storage rack system configuration. For example, the center storage rack could be mounted against a wall and, therefore, sliding racks would be on one side only.

2. Deflector members

Tape cartridge deflector members 50, shown in FIGS. 1–5, are mounted on the rear walls 31, 33, 35, 37, respectively, of sliding racks 30–36 adjacent to the leading sides of sliding racks 30–36. In the preferred embodiment, tape cartridge deflector members 50 are formed of an impact-resistant plastic, such as PVC or polyurethane. Other materials can be used as well that will provide the necessary properties of impact resistance, stiffness and some degree of resilience. Although shown as transparent in the drawings in order to more easily display the operation of tape cartridge deflector members 50, the tape cartridge deflector members can be provided in opaque colors coordinated with the rack system colors.

All of deflector members 50 are similar in design so only one will be discussed at this time. Tape cartridge deflector member 50 of the present invention includes flat mounting portion 52, shown in FIG. 4, attached to the rear wall 33 adjacent the side of sliding rack 32 and extending the full height of sliding rack 32. In the preferred embodiment, mounting portion 52 is attached by rivets 54 on the rear wall of the sliding rack. It is to be expressly understood that the present invention is not meant to be limited by the design in the descriptive embodiment used for attachment. Other attachments could be used. For example, a channel could be formed in the sliding rack and deflector member could slide into engagement within the channel. Other methods of attachment could also be used, such as screws, staples, adhesives and the like depending on the material the racks are made from.

Figure 6:
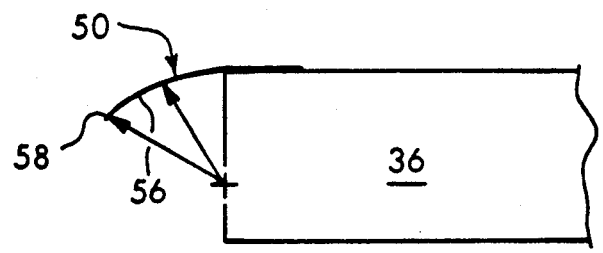
FIG. 6 is a top view of the cartridge deflector member.

Deflector portion 56 of tape cartridge deflector members 50 is curved outwardly in the direction away from center storage rack 20 and into the path of movement of sliding racks 30–36. Deflector portion 56 may be curved or angled, as desired. Thus, as shown in FIG. 6, leading edge 58 of deflector portion 56 is spaced away from center rack 20 and in the path of movement of sliding racks 30–36. As deflector portion 56 nears the sliding rack, the spacing between deflector portion 56 and center rack 20 is decreased due to the curvature or angle of deflector portion 56.

3. Operation of Deflector Member

Figure 5:
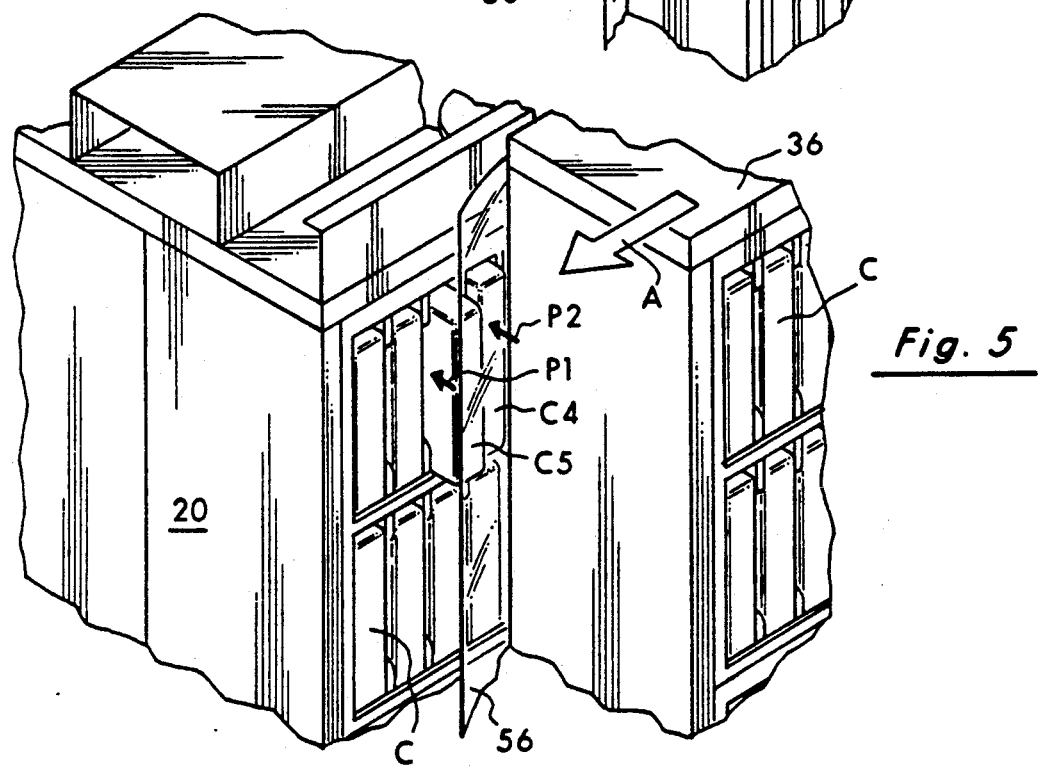
FIG. 5 is a detailed view of the cartridge deflector in operation.
Figure 7:
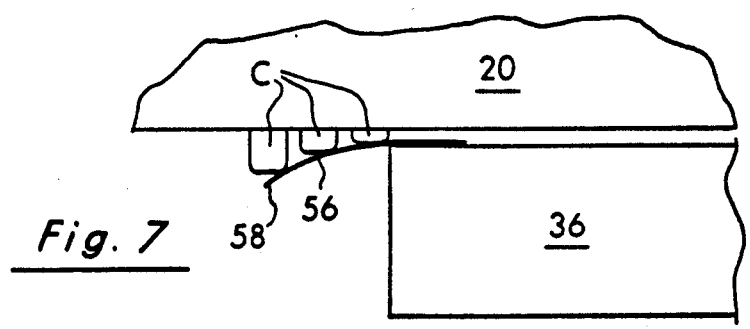
FIG. 7 is a top view of the cartridge deflector deflecting cartridges.

In operation, as shown in FIG. 5, tape cartridges $C_4$, $C_5$, extend partially out of center rack 20 and into the path of movement, indicated by arrow A, of sliding rack 36. Leading edge 58 of deflector portion 56 initially engages the tape cartridges $C_4$, $C_5$. As sliding rack 36 travels along the path in the direction of arrow A, increasing perpendicular pressure, as illustrated by arrows $P_1$, $P_2$, from deflector member 50, due to the decreasing curvature or angle of deflector portion 56, deflects the tape cartridges into the center storage rack 20 so sliding rack 36 will not strike the tape cartridges. Deflector portion 56, as shown in FIG. 7, is designed, by material choice and by the curvature or angle of deflector portion 56 to be stiff to provide the force necessary to deflect the tape cartridges yet have sufficient flexibility to provide a resilient bias from the impact against tape cartridges extending in the path of movement of sliding rack 36. Thus, tape cartridge deflector members 50 gently "sweep" the tape cartridges out of the path of movement of the sliding racks.

Figure 8:
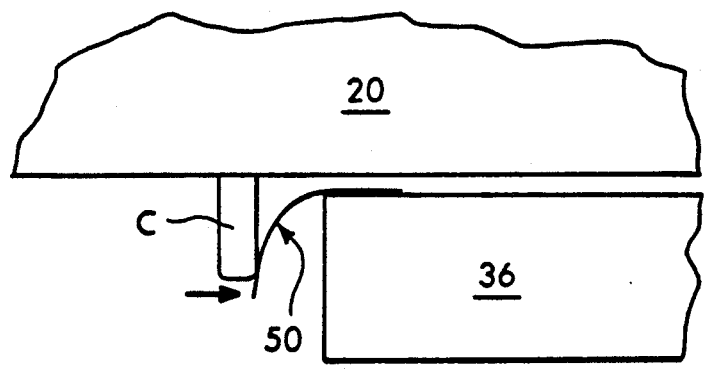
FIG. 8 is a top view of the cartridge deflector absorbing the impact of striking the cartridge.

Curved deflector portion 56 acts as a "bumper" as well to at least partially absorb the impact from striking tape cartridges extending into the path of movement of the sliding racks, especially if deflector member 50 is unable to deflect the tape cartridge. If deflector member 50, shown in FIG. 8, is unable to deflect a tape cartridge out of the path of the moving sliding rack, then curved deflector portion 56 will absorb at least some of the impact of the sliding rack against the tape cartridge to reduce the potential of damage to the tape cartridge or rack system 10. This "bumper" action is a result of the material choice and of the curvature of the deflector portion. The curvature or angle of deflector portion 56 will compress to at least partially absorb the impact. The material for deflector portion 56 is selected to be sufficiently rigid in order to deflect the tape cartridges out of the path but has some degree of flexibility in order to at least partially absorb any impact from striking the tape cartridge.

The deflector portion can be formed of various curvatures or even angular shapes according to the storage rack system used. Also, stiffer or more resilient materials can be used according to the storage rack system on which the deflector member is to be installed. Further-more deflector member 50, rather than being solid construction, could also be constructed in the form of a plurality of strips with each strip substantially oriented in the center of each tape cartridge and perpendicular to rear walls 31, 33, 35, 37.

The present invention is thus able to provide protection to sliding storage rack systems from damage due to tape cartridges extending out of a center rack and into the path of the sliding rack. This protection is twofold. First, the deflector member of the present invention sweeps tape cartridges extending into the path of movement of the sliding rack back into the center storage rack to minimize damage. This feature is due to the deflector member extending outwardly from the rear wall of the sliding rack in a direction away from the center rack and into the path of movement. Second, the deflector member is able to at least partially absorb any impact from striking the tape cartridge should the tape cartridge not be deflected. This feature is due to compression of the curved or angled portion of the deflector member creating a "bumper" for the sliding rack. The deflector member is relatively inexpensive and can be supplied as original equipment on new rack systems or retrofitted onto existing rack systems.

The present invention provides a method for minimizing damage to tape cartridges and sliding rack storage systems due to tape cartridges extending into the path of movement of the sliding racks. A center rack is provided having a storage area for a plurality of tape cartridges. A sliding rack is provided having a storage area for a plurality of tape cartridges. The sliding rack is mounted for movement relative to the center rack along a path. A deflector member formed having a curved or angled portion is affixed to the rear wall of the sliding rack so that the curved or angled portion extends into the path of movement of the sliding rack. Tape cartridges extending into the path of movement of the sliding rack are deflected by the deflector member out of the path of movement of the sliding rack. The deflector member also at least partially absorbs the impact from striking the tape cartridges.

It is to be expressly understood that this description of one possible preferred embodiment is not meant to limit the scope of the claimed inventive concept. Other variations and embodiments are considered to be within the claimed inventive concept.

We claim:

1. A storage rack system for storing tape cartridges, said system comprising:
   a center rack;
   means on said center rack for storing a plurality of tape cartridges;
   at least one sliding rack;
   means on said sliding rack for storing a plurality of tape cartridges;
   means for mounting said sliding rack for movement along a path relative to said center rack; and
   means on said sliding rack for moving tape cartridges extending into the path of movement of said sliding rack out of the path of movement of said sliding rack.

2. The system of claim 1 wherein said means for moving tape cartridges out of the path of movement of said sliding rack includes:
   means extending in a direction into the path of movement of said sliding rack and away from said center rack for engaging tape cartridges extending in the path of movement of said sliding rack to move those tape cartridges out of said path.

3. The system of claim 1 wherein said means for moving tape cartridges out of the path of movement of said sliding rack includes:
   a first portion for engaging tape cartridges extending in the path of movement of said sliding rack; and
   a second portion for deflecting those tape cartridges engaged by said first portion out of the path of movement of said sliding rack.

4. The system of claim 1 wherein said means for moving tape cartridges out of the path of movement of said sliding rack includes:
   an attachment portion for securing said means for moving tape cartridges onto said sliding rack; and
   a tape cartridge engaging portion extending in a direction away from said center rack and into the path of movement of said sliding rack for engaging any tape cartridges extending in the path of movement of said sliding rack and deflecting those tape cartridges out the path of movement of said sliding rack.

5. The system of claim 4 wherein said tape cartridge engaging portion includes:
   a curved region for engaging tape cartridges extending out of said center rack and deflecting said tape cartridges out of the path of movement of said sliding rack as said moving rack moves along the path of movement.

6. The system of claim 1 wherein said means for moving tape cartridges out of the path of movement of said sliding rack includes:
   a curved member formed of an impact resistant plastic material attached onto the rear wall of said sliding rack and extending into the path of movement of said sliding rack and away from said center rack.

7. The system of claim 1 wherein said system further comprises:
   means for at least partially absorbing the impact of striking tape cartridges extending into the path of movement of said sliding rack.

8. The system of claim 7 wherein said impact absorbing means includes:
   a curved member formed of impact-resistant plastic attached to the rear wall of said sliding rack and extending into the path of movement of said sliding rack.

9. A safety apparatus for deflecting tape cartridges extending into the path of movement of a sliding rack out of the path of movement, said apparatus comprising:
   a member for attachment onto a sliding rack, said member extending angularly in a direction into the path of movement of the sliding rack to engage any tape cartridges in the path of movement of the sliding rack and to deflect those tape cartridges out of the path of movement of the sliding rack.

10. The apparatus of claim 9 wherein said member further includes:
    a curved portion formed of an impact resistant plastic material attached onto the rear wall of said sliding rack and extending angularly into the path of movement of said sliding rack.

11. The apparatus of claim 9 wherein said apparatus further comprises:
    means for at least partially absorbing the impact of striking tape cartridges extending into the path of movement of said sliding rack.

12. The system of claim 11 wherein said impact absorbing means includes:
   a curved member formed of impact-resistant plastic attached to the rear wall of said sliding rack and extending into the path of movement of said sliding rack.

13. An apparatus for protecting tape cartridges from impact from a sliding storage rack, said apparatus comprises:
   a curved deflector member for attachment onto the rear wall of a sliding rack, said deflector member extending outwardly from the sliding rack and into the path of movement of the sliding rack to engage any tape cartridges extending in the path of movement of the sliding rack to deflect those tape cartridges out of the path of movement of the sliding rack.

14. The apparatus of claim 13 wherein said apparatus further comprises:
   a curved portion on said deflector member for compression as said deflector member engages any tape cartridge extending in the path of movement of the sliding rack to at least partially absorb the impact from engaging those tape cartridges.

15. A process for minimizing damage in a sliding storage rack system due to tape cartridges extending in the path of movement of a sliding rack, said process comprises the steps of:
   storing a plurality of tape cartridges on a center rack;
   storing a plurality of tape cartridges on a sliding rack;
   providing movement along a path between said center rack and said sliding rack;
   forming a deflector member;
   affixing said deflector member on said sliding rack to be oriented in the path of movement of the sliding rack to engage tape cartridges stored in the center rack and extending into the path of movement of the sliding rack and to deflect the aforesaid extended tape cartridges out of the path of the sliding rack and into said center rack.

16. The process of claim 15 wherein said step of forming a deflector member further includes:
   forming the deflector member in a curved shape.

17. The process of claim 15 wherein said process further comprises the step of:
   forming the deflector of a flexible plastic material in a curved shape to at least partially absorb the impact from engaging tape cartridges or other objects extending in the path of movement of the sliding rack.

* * * * *